United States Patent [19]

Torres

[11] Patent Number: 5,416,901
[45] Date of Patent: May 16, 1995

[54] METHOD AND APPARATUS FOR FACILITATING DIRECT ICON MANIPULATION OPERATIONS IN A DATA PROCESSING SYSTEM

[75] Inventor: Robert J. Torres, Colleyville, Tex.

[73] Assignee: International Business Machines Corporation, Armonk, N.Y.

[21] Appl. No.: 991,730

[22] Filed: Dec. 17, 1992

[51] Int. Cl.[6] .............................................. G06F 15/62
[52] U.S. Cl. ................................................... 395/159
[58] Field of Search ............... 395/149, 155, 156, 159, 395/161

[56] References Cited

U.S. PATENT DOCUMENTS

| | | | |
|---|---|---|---|
| 4,656,603 | 4/1987 | Dunn | 395/159 |
| 4,692,858 | 9/1987 | Redford et al. | 395/156 |
| 4,813,013 | 3/1989 | Dunn | 395/156 |
| 5,157,763 | 10/1992 | Peters et al. | 395/161 |
| 5,169,342 | 12/1992 | Steele et al. | 395/159 |
| 5,228,123 | 7/1993 | Heckel | 395/155 |
| 5,251,291 | 10/1993 | Malcolm | 395/146 |
| 5,261,091 | 11/1993 | Yuyama | 395/149 |

OTHER PUBLICATIONS

"Microsoft Windows User's Guide for the Graphical Environment Version 3.0", Microsoft Corp. (1990), pp. 20 and 56-69.

"Macintosh System Software User's Guide Version 6.0", Apple Computer, Inc. (1988), pp. 105–112.

Korech et al., "Embedded Menus: Selecting Items in Context", Communications of the ACM, vol. 29 No. 4 (Apr. 1986), pp. 312–318.

Research Disclosure #31244 (Apr. 1990), p. 321.

"Macintosh System Software User's Guide Version 6.0", Apple Computer, Inc. (1988), pp. 28–36 and 105–112.

*Primary Examiner*—Heather R. Herndon
*Assistant Examiner*—N. Kenneth Burraston
*Attorney, Agent, or Firm*—Melvin A. Hunn; Andrew J. Dillon

[57] ABSTRACT

A method and apparatus is provided for facilitating direct icon manipulation operations in a data processing system. A selection icon is generated which corresponds to an operator's selection of data fields from a plurality of data fields. The selection icon may be applied to a particular category of software objects to automatically include or exclude selected data fields in a direct icon manipulation operation, such as a drag-and-drop operation.

17 Claims, 8 Drawing Sheets

METHOD AND APPARATUS FOR FACILITATING DIRECT ICON MANIPULATION OPERATIONS IN A DATA PROCESSING SYSTEM

BACKGROUND OF THE INVENTION

1. Technical Field

The present invention relates in general to data processing systems which are suitable for icon-based operations, and in particular to data processing systems which allow direct icon manipulation operations.

2. Description of the Related Art

In modern data processing operations, it is conventional to have one or more icons displayed on a video display, each of which represent a collection of underlying data. Typically, the data is arranged in a plurality of data fields. For example, an icon can be used to represent a particular entry in an address book. The plurality of fields of data which correspond to the particular representative icon may include name, home phone number, home address, business phone number, business address, E-mail address, facsimile numbers, work department names and numbers, local area network address, and other pertinent identifying information. Address listings in particular have become fairly complicated in view of the numerous modes of communication available with the proliferation of cellular phones, personal fax machines, and home computing devices. It is highly likely that a typical entry in an electronic address book may contain dozens of fields of data which provide useful information regarding the various modes of communicating with family members, friends, business associates, and vendors.

However, modern data processing techniques heavily rely upon the direct manipulation of icons to perform certain operations. For example, graphical pointing devices have been widely recognized as useful tools for manipulating software objects and performing operations upon the software objects. One huge benefit of utilizing graphical pointing devices is that little or no instruction is required since most operators have an intuitive feel for operations which involve graphical pointing devices. One of the most useful operations is the drag-and-drop operation, wherein a graphical pointing device is utilized to select software objects and move them to particular workspaces, storage bins, and iconically-represented functions. For example, a graphical pointing device may be used to select an iconic representation of a software object, such as an address book entry, and to drag that iconic representation of the phone book entry to an iconic representation of a telephone, which initiates a telephone call to the person identified in the software object corresponding to the address book entry. However, due to the fact that most individuals have numerous telephone numbers, it is difficult to initiate the telephone call using a drag-and-drop operation.

Other types of direct icon manipulation operations are significantly impeded, not by the proliferation of data fields in a software object, but by the ambiguity inherent in a combination of a software object and a particular direct icon manipulation operation. For example, using a drag-and-drop operation to drag an address book entry icon to a spread sheet cell or to a document is an inherently ambiguous operation, since it is not clear which particular data fields are of utility. In this particular instance, it is unclear whether the person's name should be dropped, whether the person's E-mail identification should be dropped, or whether the person's entire record should be dropped.

Consequently, in many circumstances the beneficial aspects of utilizing direct icon manipulation operations to perform operations is lost. The operator must resort to reading information from one window or workspace and keying that information into another window or workspace. The speed with which direct icon manipulation operations can be performed is thus no longer realized. Furthermore, the errors inherent in rekeying information between workspaces arises, a disadvantage which is not a great problem in direct icon manipulation operations.

Finally, the synergistic effects of defining operations in terms which correspond to operator intuition is lost and is instead replaced with clumsy and hard-to-learn menus, and keying instructions. Thus, it appears that the proliferation of data fields commonly used by operators, and the significant number of ambiguous direct icon manipulation operations, may combine to stifle the growing effectiveness and industry reliance upon the iconographic representation of software objects and corresponding reliance upon direct icon manipulation operations to facilitate data processing.

SUMMARY OF THE INVENTION

It is one objective of the present invention to provide a method and apparatus which facilitates icon-based operations in a data processing system, which allows the operator to select particular ones of a plurality of data fields of a particular icon type for utilization in particular direct icon manipulation operations, and which records the operator selection and generates a visual representation which is indicative thereof which is subject to direct icon manipulation operations, which allows the visual representation to be used to perform direct icon manipulation operations to automatically include or exclude from the direct icon manipulation operation data from particular ones of the data fields.

It is a more particular objective of the present invention to provide a method and apparatus for facilitating icon-based operations in a data processing system which allows operator selection of particular ones of a plurality of data fields of a particular icon type for utilization in particular direct icon manipulation operations, and which automatically generates a data template and iconic representation thereof, which can be utilized by the operator to perform drag-and-drop operations to deliver data from at least one particular data field to at least one particular drop field, but which does not deliver data from selected others of the plurality of data fields.

These and other objectives are achieved as is now described. When viewed broadly as a method, the present invention is directed to a method of facilitating icon-based operations in a data processing system. Typically, the data processing system displays for operator selection a plurality of icon types, each icon type represents and identifies data which is arranged in a plurality of data fields. The data processing system is typically capable of performing direct icon manipulation operations which utilize data from selected ones of the plurality of data fields. The method includes the steps of: (a) allowing operator selection of particular ones of the plurality of data fields of a particular icon type for utilization in particular direct icon manipulation operations; (b) recording the operator selection and generating a visual representation which is indicative thereof, which is subject to direct icon manipulation operations; and (c) utilizing the visual representation to perform direct icon manipulation operations to automatically include or exclude from the direct icon manipulation operations data from particular ones of the data fields, in accordance with the operator selection. Preferably, the visual representation which is generated is an icon which is displayed on the data processing system, which resembles, but which is not identical to, a particular icon type. The icon represents a "data template" which may be selectively applied during direct icon manipulation operations to particular software objects which provides for the automatic inclusion or exclusion of data from particular fields. In the preferred embodiment, the iconic representation of the template is useful in drag-and-drop operations.

When viewed broadly as an apparatus, the present invention comprises a data processing system for improved direct icon manipulation operations which include at least one icon type which is representative of a plurality of software objects composed of data arranged in a plurality of fields. In the apparatus, a number of components cooperate together, including: (a) a selection means for allowing operator selection of particular ones of the plurality of data fields which contain data useful in a particular direct icon manipulation operation; (b) a selection icon generation means which automatically generates a selection icon which is representative of the particular ones of the plurality of data fields which were selected by the operator; (c) a template generation means which automatically generates a data template which may be called through the selection icon; and (d) a means for applying said selection icon to selected ones of the plurality of software objects to result in inclusion and exclusion of data from selected fields in a particular direct icon manipulation operation.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
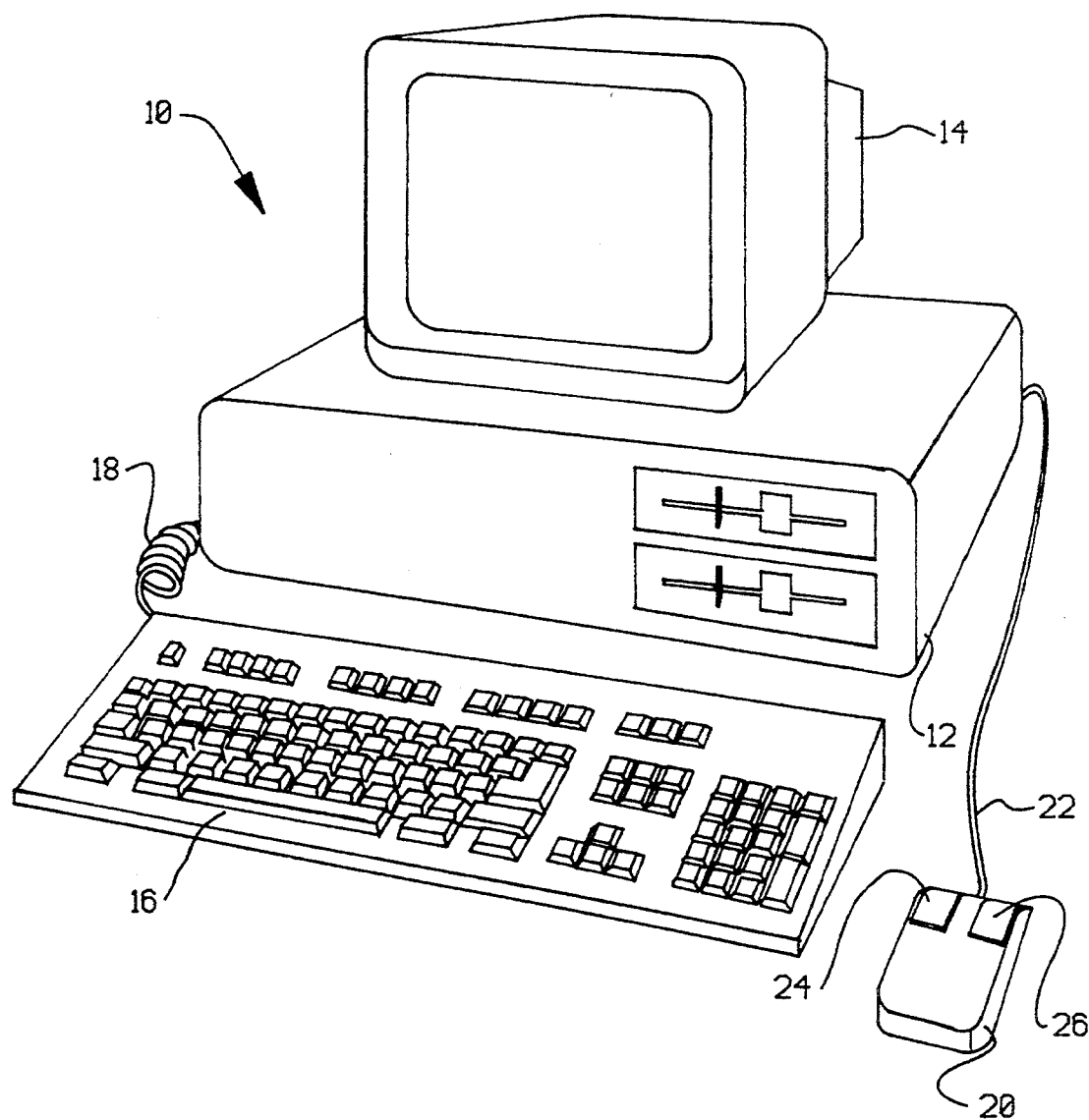
FIG. 1 is a pictorial representation of a data processing system in accordance with the present invention.

With reference now to the figures and in particular with reference to FIG. 1, there is depicted a pictorial representation of data processing system 10 which may be programmed in accordance with the present invention. As may be seen, data processing system 10 includes processor 12 which preferably includes a graphics processor, memory device and central processor (not shown). Coupled to processor 12 is video display 14 which may be implemented utilizing either a color or monochromatic monitor, in a manner well known in the art. Also coupled to processor 12 is keyboard 16. Keyboard 16 preferably comprises a standard computer keyboard which is coupled to the processor by means of cable 18.

Also coupled to processor 12 is a graphical pointing device, such as mouse 20. Mouse 20 is coupled to processor 12, in a manner well known in the art, via cable 22. As is shown, mouse 20 may include left button 24, and right button 26, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method of the present invention. Upon reference to the foregoing, those skilled in the art will appreciate that data processing system 10 may be implemented utilizing a so-called personal computer, such as the Model 80 PS/2 computer manufactured by International Business Machines Corporation of Armonk, New York.

Figure 2A:
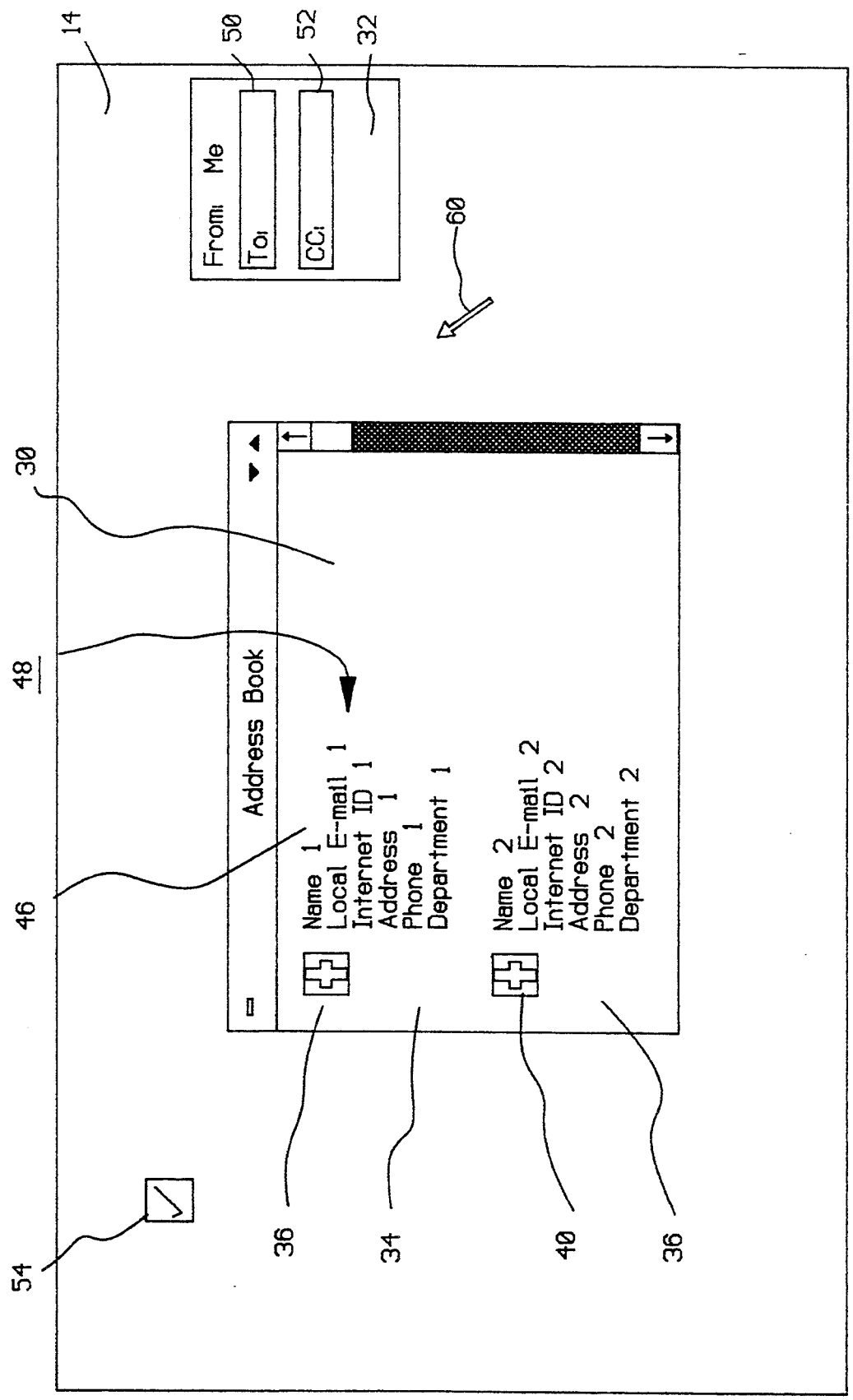
FIGS. 2a, 2b, and 2c are pictorial representations of exemplary graphical user interface screens which depict the use of the present invention.
Figure 2B:
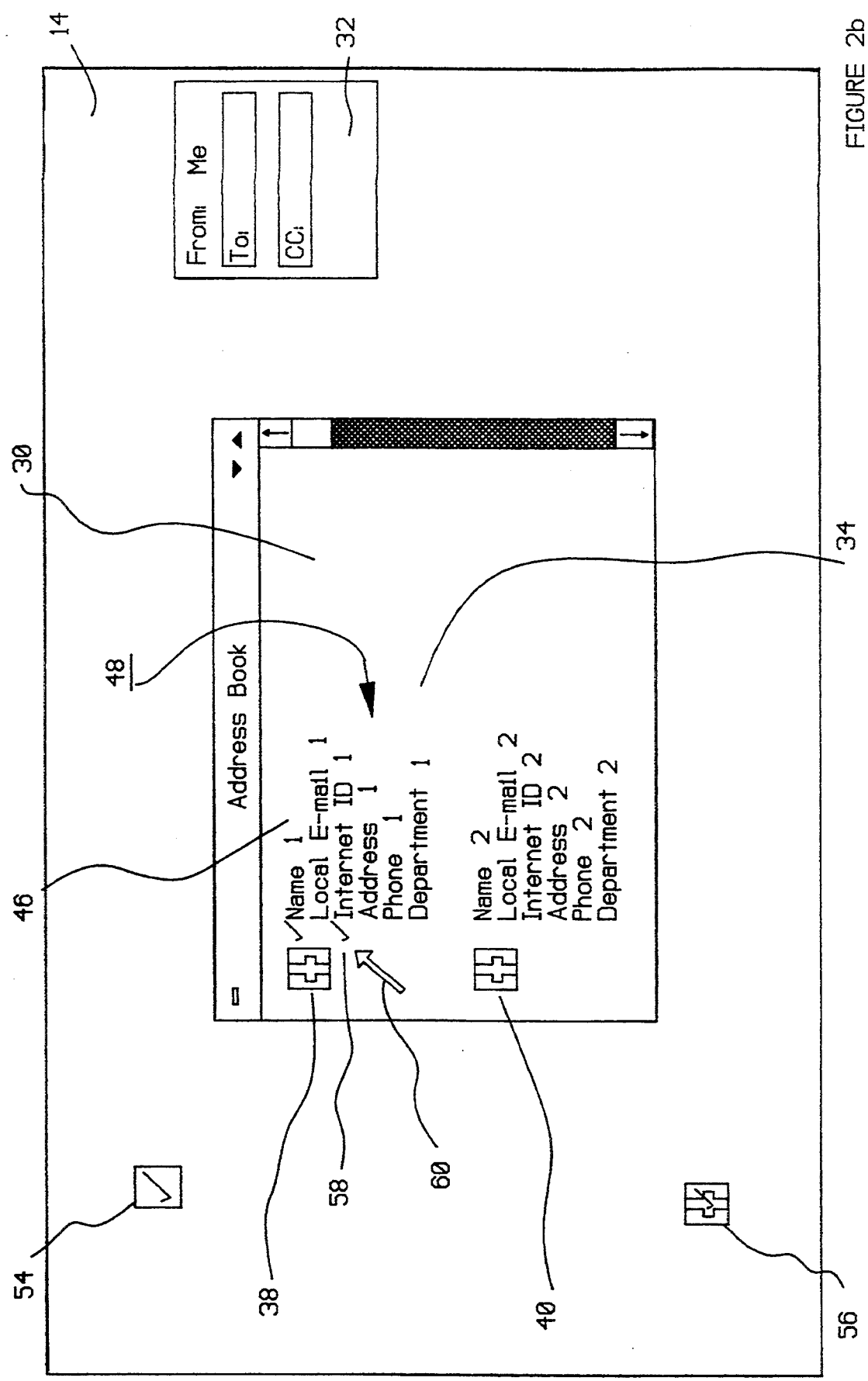
Figure 2C:
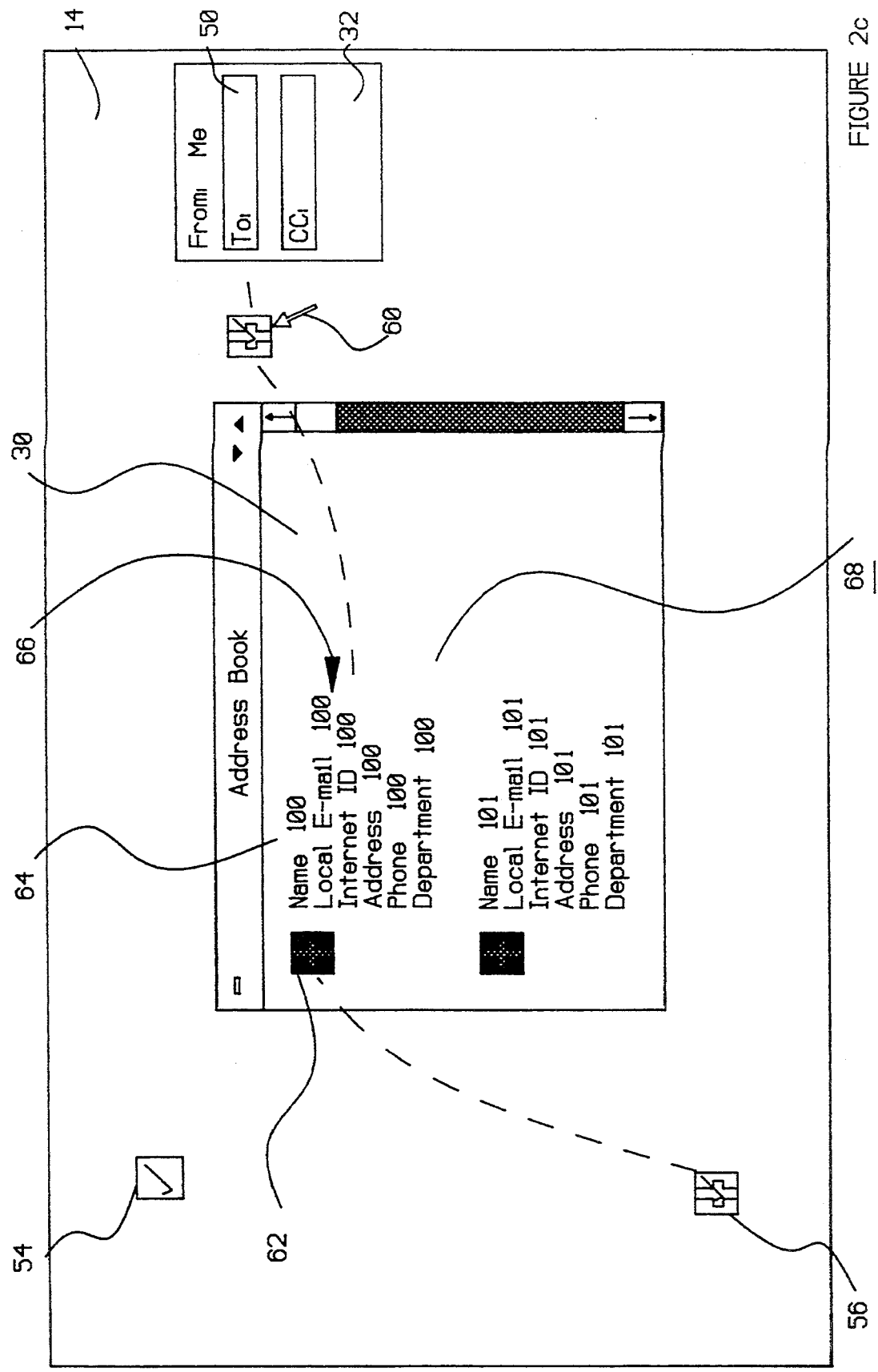

The method and apparatus of the present invention can best be understood first with reference to a progression of displays on video display 14 which comprise FIGS. 2a, 2b, and 2c, which are arranged in temporal order. As is depicted in FIG. 2a, video display 14 includes address book window 30 and addressing window 32. Address book window 30 is a conventional accumulation of software objects arranged in a rational fashion which preserves information pertaining to the names, addresses, telephone numbers, facsimile numbers, and electronic communication identification numbers for family members, friends, business associates, and vendors. First software object 34 is displayed, and pertains to individual number 1 in the address book. Second software object 36 is also displayed, and pertains to individual number 2 in the address book. Conventional scrolling operations are allowed for upward or downward movement within the electronic address book.

As is shown in FIG. 2a, first software object 34 and second software object 36 are visually and operationally represented by icons 38, 40, respectively. As is conventional, graphical pointing device 60 may be utilized to select one or both of first software object 34 and second software object 36 for use in conventional direct icon manipulation operations, such as a drag-and-drop operation to move the data represented by icons 38, 40 to another window, workspace, or iconic representation of a system function. For example, graphical pointing device 60 may be utilized to move data 46 which is arranged in data fields 48, and is visually represented by icon 38, to addressing window 32 through use of a conventional drag-and-drop operation. As was discussed in the description of the prior art, uncertainty arises in this operation, since it is not clear whether all or selected portions of data 46 should be dropped to to-field 50 and cc-field 52 of addressing window 32. Therefore, in accordance with the present invention, selection implement 54 is provided in video display 14, and can be used to designate particular ones of data field 48 which are to be included and excluded in drag-and-drop operations performed which involve icon 38.

As is best shown in FIG. 2b, graphical pointing device 60 may be utilized (through manipulation of mouse 20) to identify particular ones of data fields 48 which will be either included or excluded from particular direct icon manipulation operations. The use of selection implement 54 will preferably follow a preestablished convention. For example, selection implement 54 may be utilized to designate items which are excluded from direct icon manipulation operations. Alternately, selection implement 54 may be utilized to designate those data fields of data fields 48 which are to be included a particular direct icon manipulation.

According to the embodiment which is depicted in FIG. 2a, selection implement 54 may be utilized to identify particular ones of data fields 48 of data 46 which are included in subsequent direct icon manipulation operations which include software object 34 through icon 38. Preferably, at the end of the selection process, selection icon 56 is generated which graphically represents the user selections of data fields 48. Selection icon 56 is a general purpose iconographic representation of a general purpose data template which is in accord with the operator selections. As is shown, selection icon 56 resembles the icon type of icons 38, 40, but is not identical to the icons 38, 40. As is shown, a tiny check mark is placed at the center portion of selection icon 56. The check mark corresponds to the graphic representation of selection implement 54. This provides a visual and intuitive indication that selection icon 56 may be utilized in direct icon manipulation operations, and provides a data filter template which corresponds to the selections made by the operator during the establishment of selection icon 56.

In the preferred embodiment, selection icon 56 is associated with, and representative of, a recordation of the user selections of particular ones of data fields 48. Selection icon 56 may be applied to any of the software objects contained in the address book which is displayed in address book window 30. For example, the operator may scroll downward within the electronic address book to locate the one hundredth entry in the address book. Selection icon 56 may be selected through use of graphical pointing device 60. This operation is graphically depicted in FIG. 2c. The drag-and-drop operation includes selection icon 56, icon 62, which represents software object 64 in address book window 30, and to-field 50 of addressing window 32. In temporal order, the sequence of operations is as follows: (1) graphical pointing device 60 is utilized to select selection icon 56 and place it upon icon 62 which iconographically represents software object 64; (2) clicking or releasing of mouse buttons 24, 26 may be utilized to apply the data template which is visually represented by selection icon 56 to data 66 contained in data fields 68; and (3) graphical pointing device 60 is then utilized to drag the data contained in the unmasked ones of data fields 68 to to-field 50 of addressing window. Selection icon 56 may be utilized in a similar fashion to select one or more recipients of carbon copies of the communication by dragging and dropping only data from unmasked data fields to the cc-field 52 of addressing window 32.

In alternative embodiments, these operations may be performed through use of keyboard 16 and the cursor of video display 14, so the present invention is not necessarily reliant upon the use of graphical pointing devices. In such other embodiments, the cursor may be located on an icon, and selected keys depressed to perform the operations which are graphically depicted in FIG. 2c. In still other embodiments, a plurality of selection implements may be provided to create a plurality of selection icons, each corresponding to a different data template. Each selection icon may then correspond to frequently performed direct icon manipulation operation. For example, one selection icon may be provided for common internetwork communications, while still other selection icons may be provided for U.S. mail communications, facsimile communications, or courier service communications. The software routines of the preferred embodiment of the present invention are depicted in flowchart form in FIGS. 3, 4, 5, and 6 and will be described herebelow with respect to the particular embodiment depicted in FIGS. 2a, 2b, and 2c.

Figure 3:
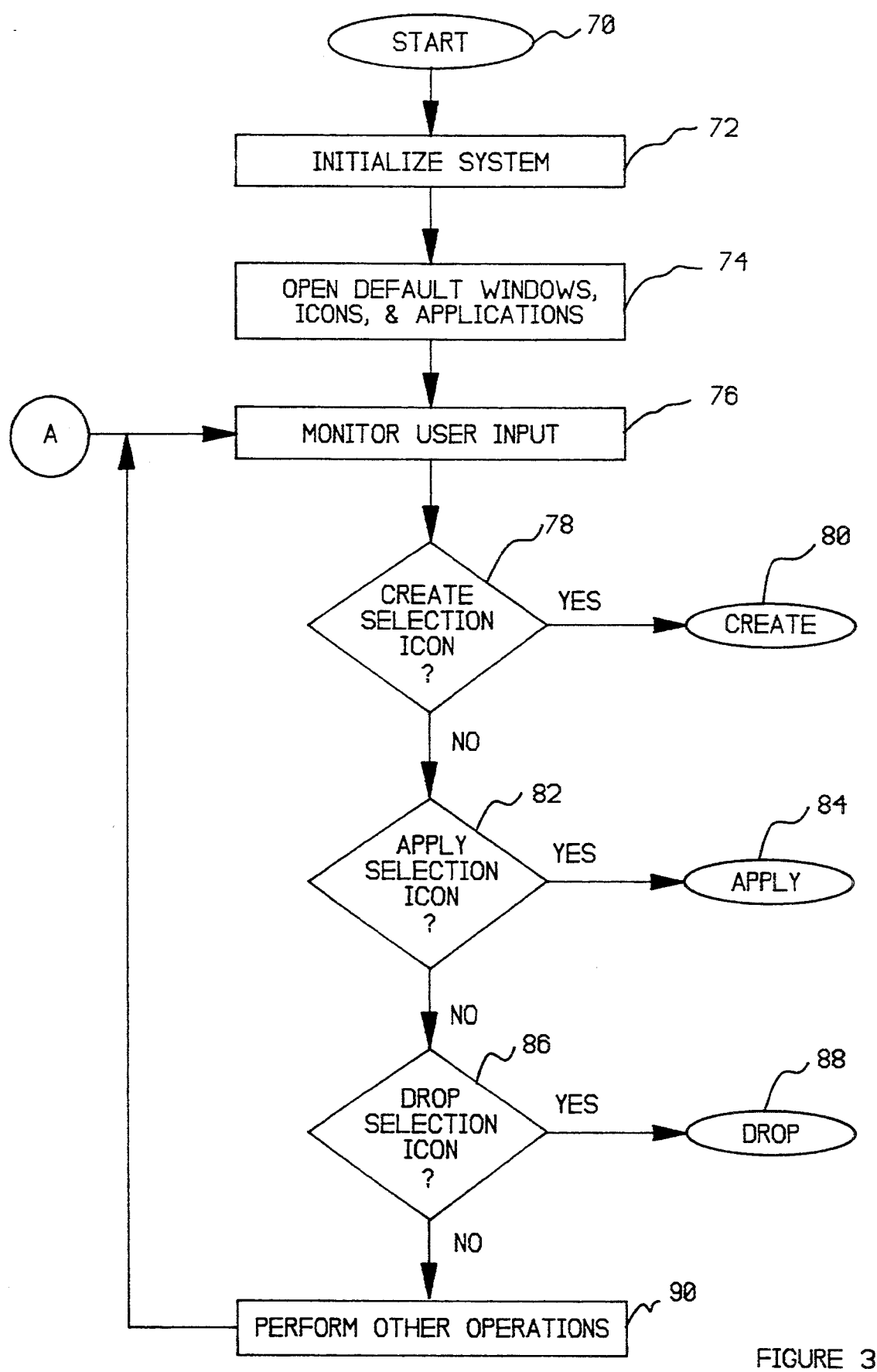
FIGS. 3, 4, 5, and 6 are flowchart representations of the preferred software implementation of the present method and apparatus for facilitating icon-based operations, with FIG. 3 providing an overview, FIG. 4 providing a detailed view of the creation of a selection icon, FIG. 5 providing an overview of the application of a selection icon, and FIG. 6 providing an overview of the selective transfer of data using the selection icon.
Figure 4:
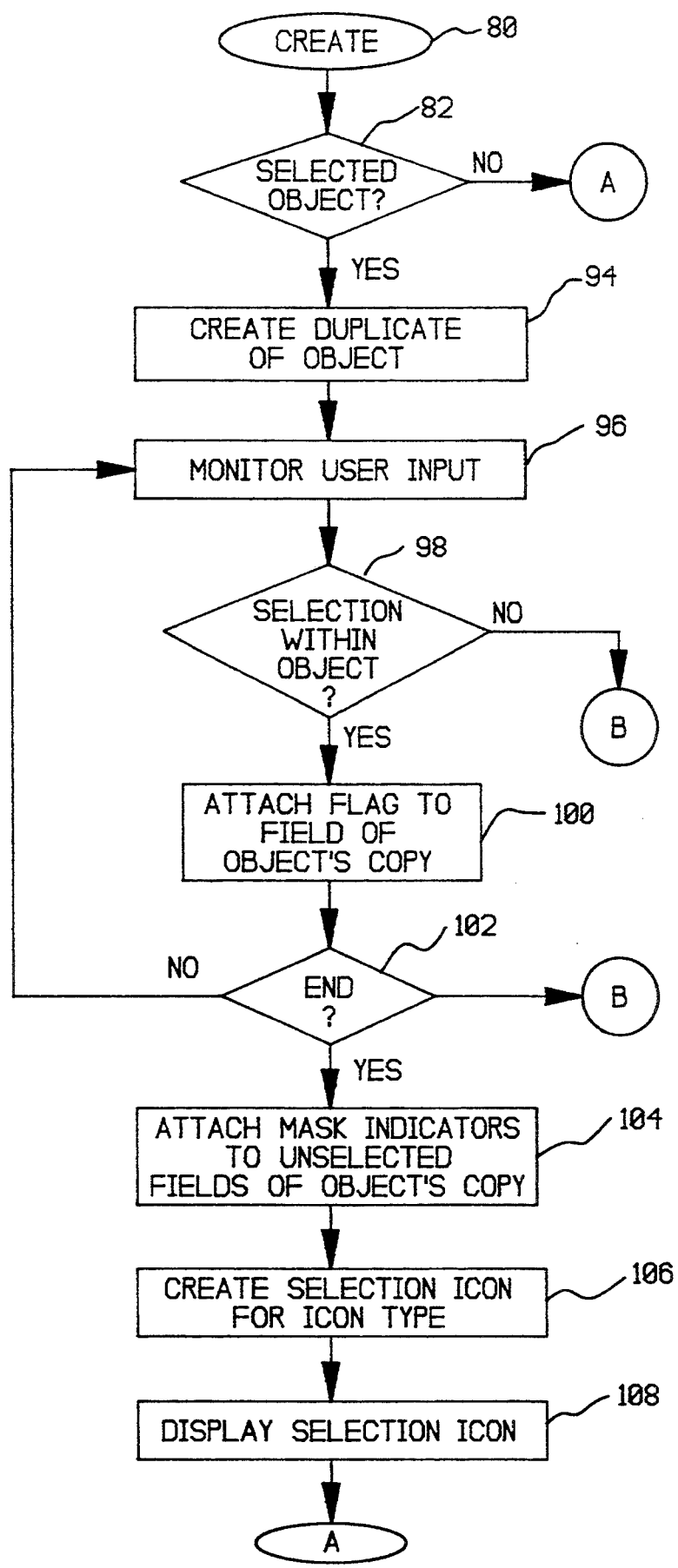
Figure 5:
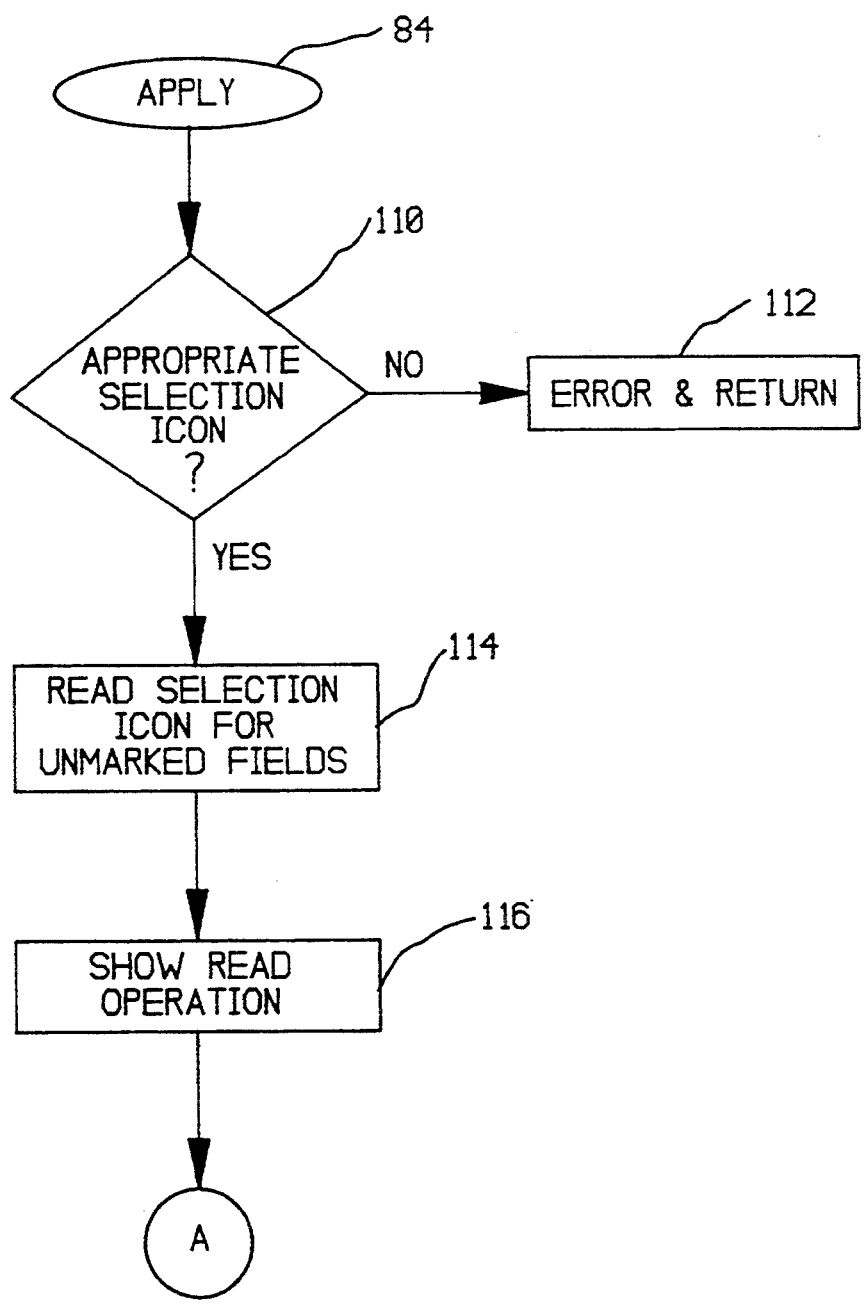
Figure 6:
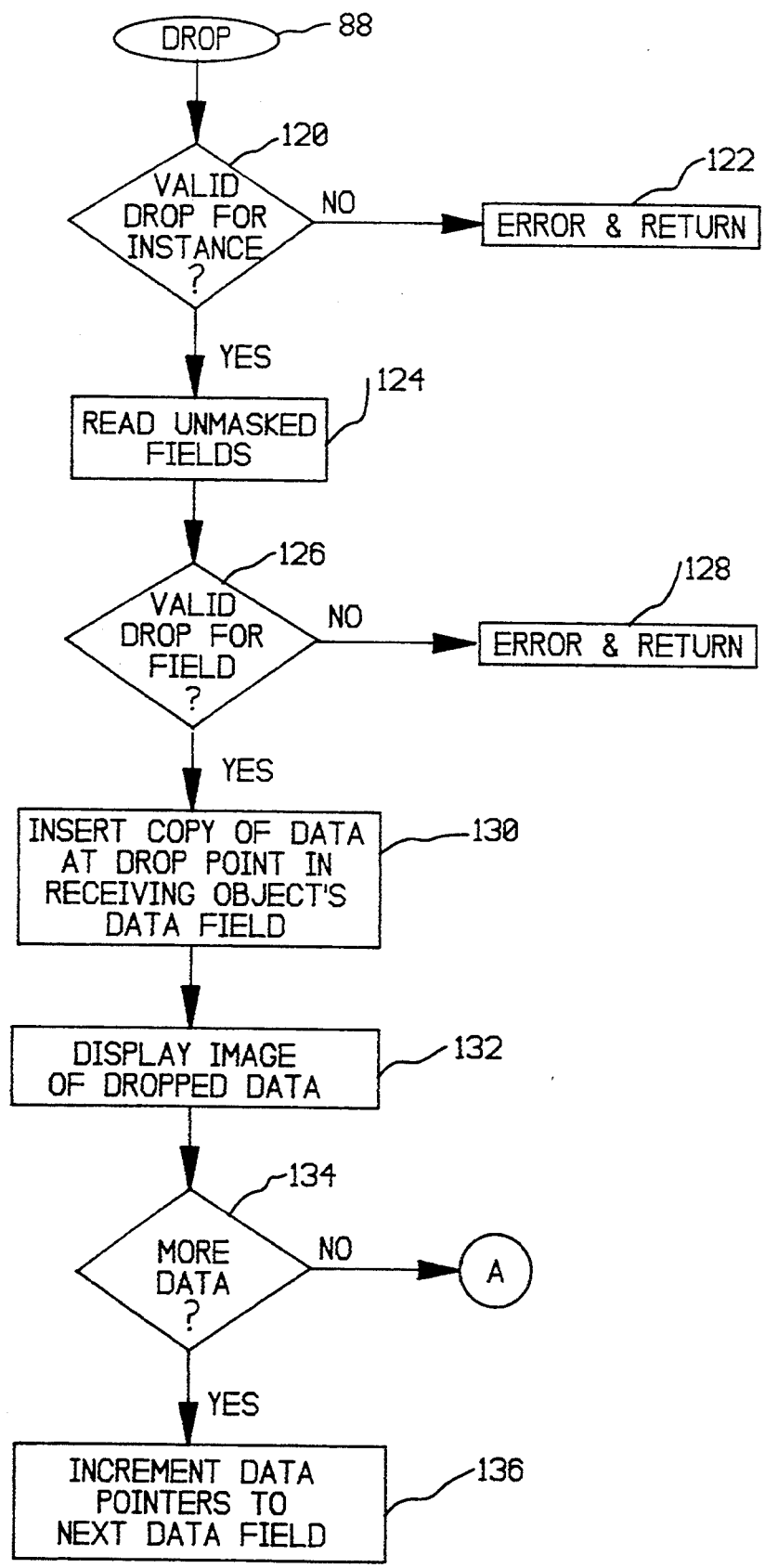

With reference first to FIG. 3, the principal operations of the present invention can be characterized as: (1) the creation of an icon mask; (2) the application of an icon mask to an icon; and (3) the delivery of data in accordance with the data filter represented by the icon mask. The selection of one or more of these principal functions is identified in FIG. 3. FIG. 4 provides an overview of the preferred software routine for creating a selection icon. FIG. 5 provides a detailed flowchart for the application of a selection icon. FIG. 6 provides a detailed flowchart for the delivery of data in accordance with the data template represented by a selection icon. As was discussed above, FIG. 2b graphically depicts the creation of a selection icon, while FIG. 2c graphically depicts the application of a selection icon and the delivery of data from appropriate data fields through use of the selection icon.

With reference again to FIG. 3, the process begins at software block 70. In accordance with software block 72, the data processing system 10 is initialized. Next, as set forth in software block 74, the windows and default icons are opened for display. For example, one or more icons such as selection icon 54 may be displayed on video display 14 of data processing system 10. In addition, one or more previously created selection icons, such as selection icon 56 may also be displayed on video display 14 of data processing system 10. In accordance with software block 76, data processing system 10 monitors for user input. In accordance with software blocks 78, 82, and 86, data processing system 10 determines whether an operator selects predefined routines for creating, applying, and dropping selection icons. If the routine for creating selection icons is selected, as determined by software block 78, the process continues in software block 80, which is set forth in greater detail in FIG. 4. If, however, the routine for application of a previously generated selection icon is selected, as determined in software block 82, the process continues in software block 84, which is depicted in greater detail in FIG. 5. If, however, the routine from dropping selection icons is selected, as determined in software block 86, the process continues at software block 88, which is set forth in greater detail inn FIG. 6. If none of these functions are selected by the operator, data processing system 10 determines what other operations are required, in accordance with software block 90, and returns to software block 76 to continue monitoring for user input for the selection of one or more of these routines.

Assuming that the operator selects the routine for creation of a selection icon, the process continues as is set forth in FIG. 4. In accordance with software block 92, data processing system 10 determines whether or not the operator has selected a particular software object; if not, the process continues at software block 76 of FIG. 3 by continuing to monitor for user input; however, if a particular object is selected by the operator, the process continues in software block 94, wherein data processing system 10 creates a duplicate of the software object which is utilized for purposes of creating a selection icon and corresponding data template which is of general applicability to other software objects of the kind selected by the operator.

Next, in accordance with software block 96, data processing system 10 monitors for user input corresponding to operation of selection implement 54 of FIG. 2b. As was discussed in connection with that figure, selection implement 54 may be utilized through graphical pointing device 60 to designate particular ones of data fields in the software object which are to be passed automatically in direct icon manipulation operations, such as drag-and-drop operations. If no particular data fields are selected within a predetermined time interval, the process jumps to software block 102 However, assuming that the operator has selected one data field, in accordance with software block 100, data processing system 10 attaches a flag to that field in the object's copy.

Next, in accordance with software block 102, data processing system 10 determines whether the operator has called for the end of the selection process of data fields which are to pass during subsequent direct icon manipulation operations. If the user does not call for an end to this process, the routine returns to software block 96, wherein data processing system 10 monitors for additional operator input, and in particular monitors for the designation of additional fields which are to be identified with the data template. Once all the appropriate data fields have been selected by the operator, the process continues in software block 104 by attaching mask indicators to unselected fields of the object's copy. These mask indicators will prevent the passage of data during subsequent direct icon manipulation operations which involve the selection icon.

Then, in accordance with software block 106, a selection icon is created for the particular icon type. In the examples of FIG. 2a, 2b, and 2c, only one icon type is depicted; however, in alternative embodiments of this invention selection icons may be created for use with many other varieties of icon types, and not just the icons which are representative of entries in an address book. The concepts of the present invention have general applicability to all iconographic representations of software objects. Finally, in accordance with software block 108, data processing system 10 displays the selection icon on video display 14.

As is depicted in FIG. 2a, selection icon 56 closely resembles the icon type which is utilized to represent entries in an electronic address book. This is particularly useful, since it allows an operator to intuitively link particular selection icons with particular icon types. The particular selection icon 56 generated in FIG. 2b includes components of both selection implement 54 and the icon type of icons 38, 40. This allows the user to utilize his or her intuition in performing subsequent direct icon manipulation operations, and is particularly useful when video display 14 is crowded with a variety of icon types as well as a variety of selection icons with one or more selection icons relating to a particular icon type.

The routine for applying the selection icon created in accordance with the process outlined in FIG. 4 is set forth in flowchart form in FIG. 5. In accordance with software block 84, a selection icon is applied to the iconographic representation of a particular software object. With reference to the example of FIG. 2c, graphical pointing device 60 is utilized to move selection icon 56 into an overlapping position with icon 62, and one or more of mouse buttons 24, 26 are depressed to initiate the application of the selection icon to a particular iconographic representation of a software object. In accordance with software block 110, data processing system 10 determines whether or not this application is appropriate; if not, the process continues in software block 112 by providing an error message and returning for receipt of proper operator input; however, if the application of the selection of icon is appropriate, the process continues in software block 114. The example of FIG. 2c provides a graphic depiction of an appropriate application of the selection icon. In this instance, selection icon 56 is an icon which visually represents a data template which has been crafted with regard to the particular software objects in the address book which is displayed in address book window 30. The shape and form of selection icon 56 is similar to that of icon 62, as well as the selection implement 54. This provides the user with a graphical indication that it is appropriate to apply selection icon 56 to icon 62, or any other iconographic representation of entries in the address book displayed in address book window 30. This is one principal advantage of generating a selection icon which is a composite of the selection implement as well as the icon type which is representative of software objects appropriate for a particular direct icon manipulation operations.

Assuming that an appropriate selection icon has been applied to an iconographic representation of a software object, in accordance with software block 114, data processing system 10 reads the selection icon for data contained in the unmasked fields. Next, in accordance with software block 116, data processing system 10 preferably provides the operator with the visual indication of the read operation. For example, data contained in the unmasked field which is to be transferred during the direct icon manipulation operation may be shaded, highlighted, or flashed to indicate to the operator that only data contained in those fields will be transferred in the drop operation.

The process continues with the drop operation which is depicted in flowchart form in detail in FIG. 6. With reference again to FIG. 2c, the direct icon manipulation operation includes the selection of a particular software object by applying selection icon 56 to icon 62; the process continues by utilizing graphical pointing device 60 to drag selection icon 56 to addressing window 32 to deposit information in the to-field 50. Once selection icon 56 is positioned within to-field 50 of addressing window 32, actuation of mouse buttons 24, 26 of mouse 20 may be utilized to implement the drop of data to the to-field 50.

This user operation is depicted in flowchart form by software block 88 of FIG. 6. The process continues in software block 120, wherein data processing system 10 determines whether this is a valid drop operation. Preferably, data processing system 10 includes a look-up table which determines which particular selection icons may be utilized with a particular icon type; also, data processing system 10 should include a look-up table which determines which particular drop locations are suited for use with a particular selection icon. If a selection icon is mismatched with a particular drop location, the process continues in software block 122 by providing an error message, and returning for additional operator input. However, if the drop location is suitable for use with a particular selection icon, the process continues in software block 124 by reading the unmasked fields.

Next, in accordance with software block 126, data processing system 10 determines whether a particular data field is valid for a particular drop location. If not, the process continues in software block 128 by providing an error message and returning for operator input; however, if the particular data field is valid for a particular drop location, the process continues in software block 130 by inserting a copy of the data at the drop point in the receiving object's data field. Next, in accordance with software block 132, the operator is provided with a visual indication of the transfer of data from the selection icon to the appropriate data field in the drop location. Typically, this is performed by displaying the data in the appropriate field. Next, in accordance with software block 134, data processing system 10 determines whether additional data fields need to be filled with data transferred through the selection icon. If not, the process continues by awaiting additional operator input; however, if more data is available for the drop operation, the process continues in software block 136 by incrementing the data pointers to the next data field and returning to software block 126. In this manner, a plurality of data fields may be transferred to a plurality of drop fields, with each data segment being transferred to the appropriate and corresponding drop location to ensure accurate, efficient, and useful transfer of data through the selection icon to the drop location.

As was discussed above, the present invention has utility beyond conventional drag-and-drop operations, but has been exemplified with respect with such drag-and-drop operations. Other direct icon manipulation operations may be performed utilizing the present invention to selectively transfer data from one software object to another software object. A wide array of selection icons may be provided. A subset of the selection icons may have utility with respect to a particular icon type. Other subsets may have utility with respect to other icon types. Preferably, each selection icon is a visual composite of the selection implement and the particular icon type to which it pertains. This ensures greater intuitive implementation of the invention. Additionally, the present invention may be utilized through use of keyboard 16 and the cursor of video display 14. Direct icon operations may be performed using the cursor in lieu of the graphical pointing device, such as mouse 20. In those instances, the concepts of the present invention will apply equally to the use of keyboard-driven operations.

With reference to a preferred embodiment, it will be understood by those skilled in the art that various changes in form and detail may be made therein without departing from the spirit and scope of the invention.

I claim:

1. A method of facilitating icon-based operations in a data processing system which displays for operator selection a plurality of icon types, each icon type representing and identifying data arranged in a plurality of data fields, said data processing system being capable of performing icon manipulation operations which may utilize data from selected ones of said plurality of data fields, comprising the method steps of:

allowing operator selection of particular ones of said plurality of data fields of a particular icon type for utilization in particular icon manipulation operations;

recording said operator selection and generating a visual template selection representation which is indicative thereof which is subject to icon manipulation operations;

utilizing said visual template selection representation as a template to perform icon manipulation operations to automatically apply a template representative of said operator selection to include or exclude from said icon manipulation operations data from particular ones of said plurality of data fields, in accordance with said operator selection; and applying said visual template selection representation to selected ones of said plurality of software objects in response to operator selection.

2. A method according to claim 1, further comprising:

providing a visual Selected field indication in said plurality of data fields of which particular fields have been selected by said operator.

3. A method according to claim 1, wherein said visual template selection representation comprises an icon which is displayed on said data processing system.

4. A method according to claim 1, wherein said visual template selection representation comprises an icon, which is displayed on said data processing system, which resembles, but which is not identical to, said particular one of said plurality of icon types.

5. A method according to claim 1, wherein said step of utilizing comprises:

utilizing said visual template selection representation to perform drag-and-drop operations to deliver data from said at least one particular data field selected by said operator to at least one drop field, but which does not deliver data from others of said plurality of data fields.

6. A method according to claim 1, further comprising:

utilizing said visual template selection representation indicative of said operator selection as a template for automatically determining inclusion and exclusion of data fields in an icon-based operation involving said particular icon type.

7. A method according to claim 6, wherein said icon-based operation comprises a drag-and-drop operation.

8. A method according to claim 1, further comprising:

allowing operator selection of at least one particular data field from a plurality of data fields associated with others of said plurality of icon types;

recording said operator selection and generating an additional distinct visual representation indicative thereof for each of said icon types, which is subject to icon manipulation operations; and utilizing said additional distinct visual representations to perform icon manipulation operations to automatically include or exclude from icon manipulation operations data from particular ones of said data fields of said plurality of data fields, in accordance with said operator selection.

9. A method according to claim 8, wherein said additional distinct visual representation comprise icons which resemble, but which are not identical to, associated icon types.

10. A method according to claim 8, further comprising:
   utilizing said visual representations as templates for automatically determining inclusion and exclusion of data fields in icon-based operations involving associated particular icon types.

11. A method of facilitating icon-based operations in a data processing system which displays for operator selection a plurality of icon types, each icon type being representative of a plurality of software objects, each software object including data arranged in a plurality of data fields, said data processing system being capable of performing icon manipulation operations, comprising the method steps of:
   with respect to a particular software object represented by a particular icon type, selecting particular ones of said plurality of data fields which contain data which is useful in a particular icon manipulation operation;
   automatically generating a selection icon which is representative of said particular ones of said plurality of data fields which were selected;
   automatically generating a data template which may be called through said selection icon;
   applying said selection icon to selected ones of said plurality of software objects; and
   automatically including and excluding selected data fields from said selected ones of said plurality of software objects in icon manipulation operations in accordance with said data template.

12. A method according to claim 11, wherein said icon manipulation operations include at least one drag-and-drop operation involving said selection icon.

13. A method according to claim 11, wherein said icon manipulation operations include keyboard based operations involving said selection icon.

14. A method according to claim 11, wherein said step of applying comprises:
   automatically applying said data template to selected ones of said software objects during a selection process for icon-based operations.

15. A data processing system for improved icon-manipulation operations involving at least one icon type, each being representative of a plurality of software objects composed of data arranged in a plurality of fields, comprising:
   selection means for allowing operator selection of particular ones of said plurality of data fields which contain data useful in a particular icon manipulation operation;
   selection icon generation means for automatically generating a selection icon which is representative of said particular ones of said plurality of data fields which were selected;
   template generation means for automatically generating a data template which may be called through said selection icon; and
   means for applying said selection icon to selected ones of said plurality of software objects to result in inclusion and exclusion of data from selected fields in said icon manipulation operations.

16. A data processing system according to claim 15, wherein said selection icon generation means generates an icon which is similar, but not identical, to said at least one icon type.

17. A data processing system according to claim 15, wherein said selection means includes a selection implementation which provides a visual indication of operator selection of particular data fields.

* * * * *